Lamon & Gaskill,
Steam-Boiler Condenser.

Nº 23,588. Patented Apr. 12, 1859.

Witnesses:
Isaac N. Alexander
John I. Cobb

Inventor:
Samuel Lamon
W. S. Gaskill

UNITED STATES PATENT OFFICE.

SAM. LAMON AND W. S. GASKILL, OF VAN WERT, OHIO.

DEVICE FOR HEATING FEED-WATER OF STEAM-BOILERS.

Specification of Letters Patent No. 23,588, dated April 12, 1859.

*To all whom it may concern:*

Be it known that we, SAMUEL LAMON and W. S. GASKILL, both of Van Wert, in the county of Van Wert and State of Ohio, have invented a new and Improved Device for Heating by Means of the Exhaust-Steam of an Engine the Feed or Supply Water for Steam-Boilers; and we do hereby declare that the following is a full, clear, and exact description of the same, reference being had to the annexed drawings, making a part of this specification, in which—

Figure 1:
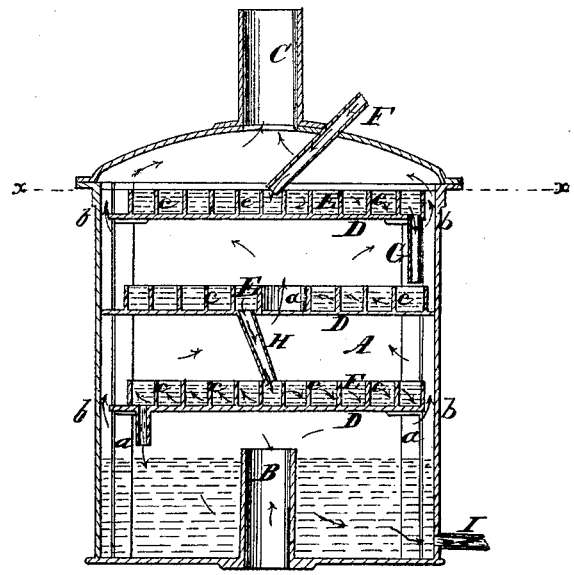
Figure 2:
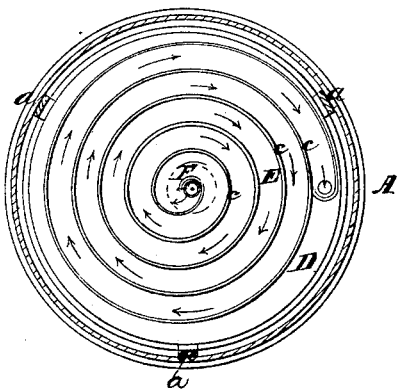

Figure 1, is a vertical central section of our invention; Fig. 2, a horizontal section of ditto, taken in the line $x$, $x$, Fig. 1.

Similar letters of reference indicate corresponding parts in the two figures.

This invention consists in introducing the exhaust steam of an engine into a cylindrical vessel provided with spiral water passages arranged in a peculiar way; and through which the water is introduced in a very circuitous manner into the boiler and exposed perfectly to the steam during the passage through said cylinder so as to become heated thereby.

To enable those skilled in the art to fully understand and construct our invention we will proceed to describe it.

A, represents a cylinder which may be of any proper dimensions and provided with a steam induction pipe B, at its lower end and a steam eduction pipe C, at its upper end. Within this cylinder A, a series of horizontal circular plates D, are placed, one above the other at suitable distances apart and attached to supports $a$. The edges of the upper and lower plates D, do not quite touch the inner side of the cylinder, spaces $b$, being allowed between them as shown in Fig. 1. The central plate D touches the sides of the cylinder and has an opening $a^x$ at its center.

On the upper surface of each plate D, a spiral or helical flanch $c$, is secured. These flanches extend from the centers to the peripheries of the plates and form spiral or helical water passages E, as shown clearly in Fig. 2.

F, is the water induction pipe which passes through the top of the cylinder A, and communicates with the center of the top water passage E, the outer end of which communicates by means of a pipe G, with the outer end of the passage immediately below. This latter water passage communicates by means of a central pipe H, with the center of the lowest water passage E, the outer end of which communicates with the lower portion of the cylinder which has a discharge pipe I, attached leading into the steam boiler.

The exhaust steam from the engine is admitted into the cylinder A, through the pipe B, and passes up around the edges of the upper and lower plates D and through the opening $a^x$ in the central plate filling the spaces between them and then passing out of the pipe C. The water that is fed into the boiler passes down the pipe F, into the center of the uppermost water passage E, and passes of course to the outer end of said passage, down the pipe G, into the outer end of the passage E, below and passing to the inner end of said passage, escapes down the pipe H, into the inner end of the lowermost passage E, and passing to the outer end of said passage escapes down into the lower part of cylinder A, and passes through the pipe I, into the boiler.

It will be seen from the above description that the water passes through the cylinder A, by a very circuitous route and will become heated without any additional expense by the exhaust steam from the engine.

Having thus described our invention, what we claim as new and desire to secure by Letters Patent, is,

The cylinder or other suitable vessel A, provided with the induction and eduction exhaust steam pipes B, C, and the spiral or helical feed water passages E, arranged substantially as and for the purpose set forth.

SAMUEL LAMON.
W. S. GASKILL.

Witnesses:
ISAAC N. ALEXANDER,
JOHN I. CABLE.